(12) United States Patent
Slater et al.

(10) Patent No.: US 8,769,609 B2
(45) Date of Patent: Jul. 1, 2014

(54) PROTECTING FILE ENTITIES

(75) Inventors: Alastair Slater, Chepstow (GB); Daniel Philip Coney, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 13/176,581

(22) Filed: Jul. 5, 2011

(65) Prior Publication Data
US 2012/0011562 A1  Jan. 12, 2012

(30) Foreign Application Priority Data

Jul. 6, 2010 (GB) .................................. 1011319.9

(51) Int. Cl.
*H04L 29/06* (2006.01)
*G06F 7/04* (2006.01)
*G06F 15/16* (2006.01)
*G06F 17/30* (2006.01)

(52) U.S. Cl.
USPC ....... 726/1; 726/3; 726/30; 707/791; 707/803

(58) Field of Classification Search
USPC .............................. 709/201; 726/30; 707/791
See application file for complete search history.

(56) References Cited

U.S. PATENT DOCUMENTS

| | | | |
|---|---|---|---|
| 6,356,941 B1 | 3/2002 | Cohen | |
| 7,308,528 B2 | 12/2007 | Kitamura et al. | |
| 7,487,009 B2 | 2/2009 | Trimmer et al. | |
| 7,512,990 B2 * | 3/2009 | Haugh et al. | 726/30 |
| 8,055,698 B2 * | 11/2011 | Gray et al. | 709/201 |
| 8,200,700 B2 * | 6/2012 | Moore et al. | 707/791 |
| 2002/0091697 A1 | 7/2002 | Huang et al. | |
| 2005/0091182 A1 * | 4/2005 | Chen et al. | 707/1 |
| 2006/0129558 A1 | 6/2006 | Brown et al. | |
| 2007/0079091 A1 | 4/2007 | Collins et al. | |
| 2008/0183802 A1 | 7/2008 | Gray et al. | |
| 2009/0094251 A1 | 4/2009 | Gladwin et al. | |
| 2009/0094679 A1 * | 4/2009 | Canning et al. | 726/3 |
| 2010/0211613 A1 * | 8/2010 | Becker et al. | 707/803 |

FOREIGN PATENT DOCUMENTS

| | | |
|---|---|---|
| EP | 2088743 | 8/2009 |
| WO | WO 01/24059 | 4/2001 |

OTHER PUBLICATIONS

GB 12 Month Office Action, dated Oct. 12, 2010, 22 pages.
CA ARCserve® Backup for Windows (Product Manual), 104 pps. Published 2009. http://support.dell.com/support/edocs/software/pwrs_ca/Manuals/ARC_TLO.PDF.

* cited by examiner

*Primary Examiner* — Shin-Hon Chen

(57) ABSTRACT

There is described a computer system to provide a filesystem, and to export a consumer directory of the filesystem for access by a consumer application over a network. The system has a protected directory. Protection controls restrict performance of file management activities on file entities of the protected directory by the consumer application.

20 Claims, 4 Drawing Sheets

PROTECTING FILE ENTITIES

CROSS-REFERENCE TO RELATED APPLICATION

This claims priority under 35 U.S.C. §119 to Great Britain Patent Application GB 1011319.9, filed Jul. 6, 2010, which is hereby incorporated by reference.

BACKGROUND

Filesystems are used to organise data into computer file entities, namely directories and files, that can be stored, manipulated and retrieved using a computer's operating system. For example, various versions of FAT (File Allocation Table) and NTFS (New Technology File System) are used with Microsoft Windows operating systems, and various versions of ext (extended file system) are used with Linux operating systems, among many others. Filesystems relate the data of named files to locations in storage. The storage can comprise physical storage devices such as, for example, hard disk drives, solid-state storage, tape storage, and CD-ROMs, and/or virtualised storage layered above such physical storage devices.

Network filesystem protocols enable users on client computers to access file entities of a remote filesystem over a network. Such access can be transparent to a user, as though the user is accessing file entities of a filesystem local to the client computer. For example, implementations of various versions of the NFS (Network File System) protocol provide an NFS service to export names and parameters of remote directories that it is desired to share, enabling a local filesystem of a client running, for example, on a Unix or Unix-like operating system to mount the exported directories. In a further example, implementations of various versions of the SMB/CIFS (Server Message Block/Common Internet File System) protocols, such as a Samba file service, enable a local filesystem of the client running on a Windows operating system to map a local drive to a network drive of a remote filesystem.

BRIEF DESCRIPTION OF THE DRAWINGS

In order that the invention may be well understood, various embodiments thereof will now be described, by way of example only, with reference to the accompanying drawings, in which.

DETAILED DESCRIPTION

Figure 1:
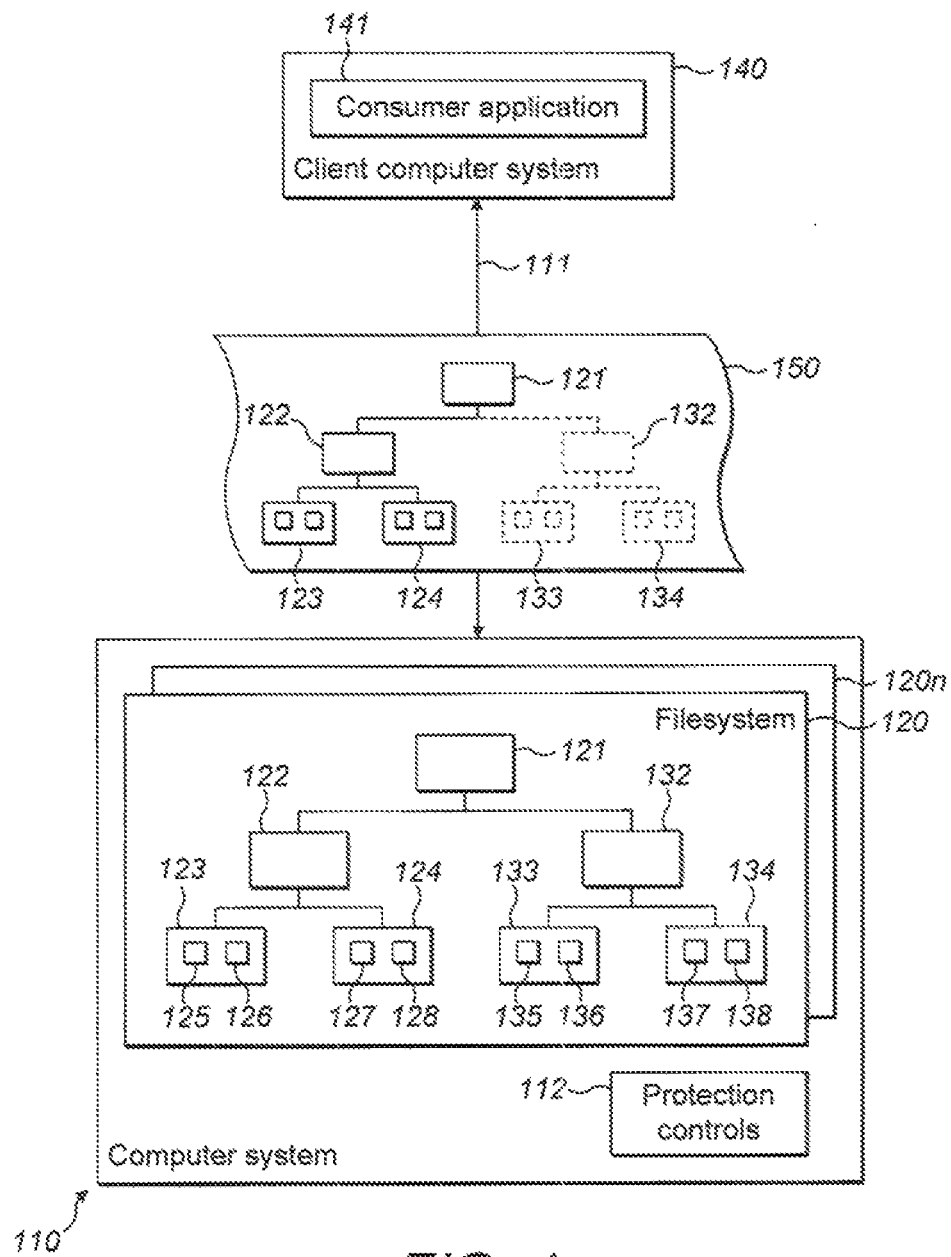
FIG. 1 is a high level functional representation of an example computer system to export a network filesystem for access by a consumer application, and a consumer application to consume file entities of the exported filesystem.

Embodiments of the invention provide a computer system operable to generate a filesystem and to export file entities of the filesystem over a network for access by a consumer application, for example a backup or shell application, to consume the exported file entities. Exported file entities that are remotely accessible by the consumer application for unrestricted performance of file management activities are sometimes herein termed consumer file entities (or consumer directories, consumer files, as appropriate). The term export, and derived terminology, as used herein relates generally to making a file entity available for network sharing, for example by mounting or mapping of a directory to a filesystem local to the consumer application, and is not intended to imply limitation to any particular filesystem or operating system technology.

The computer system in various examples comprises a protected directory, and protection controls to restrict performance of file management activities on file entities of the protected directory by the consumer application. Examples of file management activities are the execution by the computer system of create, delete, open, close, read, write, reposition, get attributes, set attributes, move or rename methods in connection with a file entity.

In some embodiments, the system stores policies that can be used by the system to automatically move file entities between the protected directory and a consumer directory. Some embodiments of the computer system comprise a management interface to manage movement of file entities between a protected directory and a non-protected, shared, consumer directory, by configuration of the protection controls and/or of the stored policies. The management interface in some examples permits movement of file entities from the protected directory directly, in response to instructions received by the management interface. The management interface in some examples can comprise a web-based graphical user interface (GUI), command line interface, or programmatic interface. Normal consumer applications do not have access to the management interface.

At least some embodiments facilitate improvements in the ability of normal users of consumer applications and/or of administrators of computer systems to protect specific file entities or types of file entity from unauthorised and/or unintentional modification by moving them at will and/or automatically according to predetermined policies into a protected, or safe, region, and restricting or preventing consumer applications from performing removal to an unprotected region. Removal of selected files from a shared consumer directory into the protected area can also facilitate simpler and/or clearer presentation and/or handling of the remaining working set of files. Policies in some embodiments cause automatic movement of file entities between the shared consumer directory and the protected directory according to at least one criterium, such as a time or time period relative to a file management event. For example, files that have not been accessed within a specified time period could be automatically moved to a specified location (directory or sub-directory) in the protected directory, and/or the moved files could be limited to a specified file type or moved according to content. In another example, files containing time sensitive information could be moved to the protected directory after final modification, perhaps according to a criterium of containing a special predetermined user-applied mark, and/or moved out of the protected directory for access by the consumer application according to a desired release time criterium.

In some embodiments, the computer system is optimised for data protection operations, for example to receive from a backup application large back up data sets in exported file entities, and can include a data deduplication system to reduce the volume of data necessary to store. Because such efficient storage practices can result in large numbers of files reflecting long backup histories, it can be particularly advantageous to reduce the number of files in the working set of files. Some examples provide inline data deduplication using a plurality of deduplicated data stores, file entities of the protected directory, and file entities of corresponding consumer directories that move file entities into the protected directory, being respectively associated with a common one of the deduplicated data stores. This arrangement facilitates movement of stored files between the protected directory and a consumer directory with minimum processing requirement, as there is no need to reconstitute the deduplicated data prior to such a move.

In some embodiments the computer system is connected to storage in the form of a storage subsystem having physical mass storage devices, such as hard disc drives or solid state storage devices, to receive and persistently store filesystem data. The storage in some examples includes one or more virtualization layers between the physical storage devices and the computer system processing and memory resources that execute the filesystem. For example, virtualization can be provided by a RAID controller that provides virtual disks for consumption by the filesystem, to which they appear as physical disks. In some examples the storage is at least partially provided in the same physical enclosure as the computer system, and in others the storage is locally attached outwith the enclosure. In still further examples, the storage can be connected to the computer system over a network, such as a dedicated storage network using, for example Fibre Channel or iSCSI technology.

In some examples, the computer system is arranged to replicate file entities of a protected directory of a similar further computer system, and to apply protection controls to replicated file entities that are different than the protection controls applied to the replicated file entities by the further computer system.

Referring to FIG. 1, a computer system 110 provides a filesystem 120. The example filesystem has a hierarchy including a top-level directory 121 associated with, or containing, first and second lower-level directories 122, 132. The first lower-level directory 122 is associated with, or contains, first and second leaf directories 123, 124. Leaf directory 123 is associated with, or contains, files 125, 126 and leaf directory 124 is associated with, or contains, files 127, 128. The second lower-level directory 132 is associated with, or contains, third and fourth leaf directories 133, 134. Leaf directory 133 is associated with, or contains, files 135, 136 and leaf directory 134 is associated with, or contains, files 137, 138. The directories 121, 122, 123 and 124 are exported over a network link 111 for access, using a network filesystem protocol, by a consumer application 141 executing on a client computer system 140.

The computer system 110 comprises protection controls 112 to restrict performance of file management activities by the consumer application 141 on at least one protected directory, for example on the second directory 132 and its associated sub-directories and files 133, 134, 135, 136, 137, 138. In at least some embodiments, protecting a directory includes protecting all associated sub-directories and files of the protected directory. Any convenient number of levels can be provided in the hierarchy of the filesystem 120, 120n. The resulting exported filesystem is represented at 150 as viewed by the consumer application 141. The protected directories 132, 133, 134, shown using broken lines in the network filesystem representation 150, are in some examples hidden from, that is not discoverable by, the consumer application 141, and will not be presented to the consumer application. In some examples consumer application 141 requests to move file entities into a protected directory using that directory's path are allowed to succeed notwithstanding that the protected directories 132, 133, 134 are not discoverable by the consumer application 141. In other examples, the protected directories 132, 133, 134 are discoverable by the consumer application 141. In some embodiments, performance of at least the following file management activities, or methods, are not permitted relative to file entities of the protected directories 132, 133, 134: create, delete, open, close, read, write, reposition, get attributes, set attributes, move or rename. At least movement of a file entity from the protected directories 132, 133, 134, and modification or deletion of a file entity of the protected directories 132, 133, 134, are not permitted to the consumer application 141. Protected directory files can be deprotected, for example by moving the files from the protected directory to the shared directory using a management interface as described below, for example to permit subsequent modification by the consumer application of the deprotected files.

In some embodiments, alternative filesystem architectures could be employed. For example, a plurality of filesystem instances 120 to 120n could be implemented, and/or the shared consumer directories and the protected directories could reside in different filesystems and/or at different levels of the filesystem hierarchy. For example, the consumer directory could be a top level share of a different filesystem. The filesystem hierarchy in some examples could be flat. In some embodiments, only the consumer directory is exported, and protected directories are not exported or otherwise made available to the consumer application.

Figure 2:
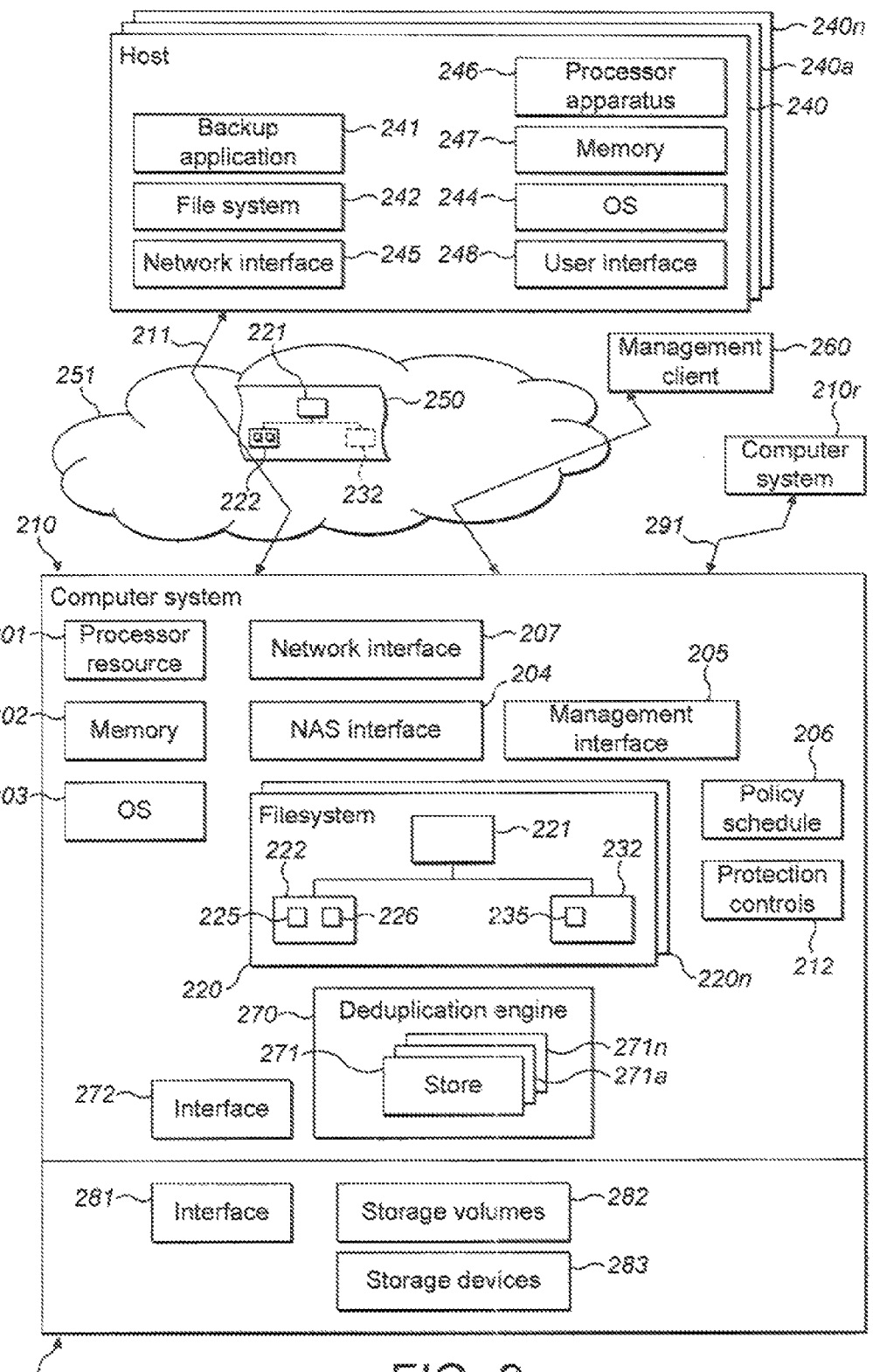
FIG. 2 is a more detailed functional representation of an example computer system to provide network filesystem access for a backup application on a host computer, and management and storage of file entities of the file system.

FIG. 2 is a functional representation of a remote host computer 240 and various elements of an example computer system 210 to provide network filesystem access to the host computer 240. The computer system 210 includes processor resource 201 comprising a processor such as a CPU (central processing unit), or a combination of processors, and a memory 202 comprising, for example, volatile memory such as DRAM, and/or non-volatile memory such as EEPROM, and/or any convenient alternative type of memory/storage in any convenient form and physical arrangement. The computer system 210 further comprises an operating system 203, for example a Unix or Unix-like operating system, or a Microsoft Windows based operating system, to perform various general functions and services of the computer system 210. A network interface 207 is also included in the computer system 210 for communicating over a network 251. In some embodiments, the network interface 207 comprises an adapter, for example an NIC (network interface controller), suited to the network, and the network comprises, for example, an Ethernet network such as Gigabit Ethernet LAN, although in alternative embodiments other types of adapter and network are employed.

The example computer system 210 also comprises at least one filesystem, for example any desired number of filesystem instances 220 to 220n, and an interface for providing network filesystem services, that is, making a directory of the filesystem 220 available over a communication network. The interface for providing network filesystem services is referred to herein as a NAS (network attached storage) interface 204. In some embodiments, the NAS interface 204 comprises an implementation of a least one network filesystem protocol, for example the NFS and/or CIFS protocol, and provides file services in relation to shared, or exported, file entities. As shown in FIG. 2, the filesystem 220 provides, for example, directory 221 and sub-directories 222 and 232 comprising respective groups of files 225, 226 and 235. The exported filesystem 251 can be mounted, or mapped, to any suitable client filesystem over the network 251, and/or accessed using a suitable network file system protocol client. For example, in embodiments where the NAS interface 204 provides Samba network file services, a consumer application 241 executing on a Unix or Unix-like operating system 244, can directly mount exported directories 221 and/or 222 to the local filesystem 242 using smbmount, or read the exported directories with a CLI using a utility such as smbclient, and a consumer application 241 executing on a Windows operating system 244 can access the exported directories as for normal local Windows folders, except for any network latency.

FIG. 2 shows a plurality of host computer systems 240, 240a, 240n. A host 240, 240a, 240n in some embodiments comprises a server computer such as a media server, executing a consumer application, for example in the form of a backup application 241. The host 240 in some examples comprises any convenient arrangement of a filesystem 242, an operating system 244, a network interface 245 such as a NIC, processor apparatus 246 such as one or more CPUs, memory 247 and a user interface 248.

Directory 220 and sub-directory 222 are made available by the computer system 210 over a communication link 211, using the communication network 251, as part of an exported filesystem (shown in abstract form as 250) for access by the backup consumer application 241, in a similar manner to the directories of the exported filesystem 150 described above with reference to FIG. 1. The computer system 210 includes protection controls 212, stored for example as a schedule of computer readable instructions in memory 202. The protection controls 212 are used, for example by special code of the computer system 210, for example included with filesystem code of the filesystem 220, 220n, to apply protection to the directory 232, to make the directory 232 a protected directory and restrict the file management activities that can be performed on file entities 232, 235 of the protected directory 232 by the backup application 241, in a manner similar to that described above with reference to the protected directory 132 of FIG. 1.

The computer system 210 in some embodiments also includes policies, stored for example in a policy schedule 206 in computer readable form in memory 202. The policy schedule 206 can be referenced by the computer system 210, for example by special code of the computer system 210, for example included with filesystem code of the filesystem 220, 220n, to cause automatic movement of file entities according to the policies, for example between the protected directory 232 and the non-protected directory 222, as described in further detail below.

In some embodiments, the computer system 210 comprises a management interface 205 to permit configuration of the protection controls 212 and the policy schedule 206. The management interface 205 can be accessed, for example through a management client 260. The access mechanism in some examples is provided by a GUI (graphical user interface), for example a web-based GUI, of the management interface 205, accessible by a web-browser of the management client 260. Alternatively or additionally, a CLI (command line interface) and/or programmatic management interface can be provided. The management client can be local to and/or directly attached to the computer system 210, or connected remotely, for example over the network 251 and the network interface 207, and in some embodiments can run from a host 240, 240a, 240n. In some embodiments, the management interface 205 permits direct manipulation of file entities, including protected file entities, by a human administrator through the management client 260.

Normal consumer applications such as backup application 241 do not have access to the management interface 205. In some embodiments, different communication paths and/or mechanisms are used for communication with the consumer application 241 than with the management interface 205. For example, requests received (in the example of a web interface) from a management client 260 at the appropriate http or https port/socket of the network interface 207 are forwarded to the management interface 205, and requests from the consumer application 241 received at the network file system socket(s) of the network interface 207 are forwarded to the NAS interface 204 for handling. Access security is assisted in some embodiments by limiting access to the management client to authorised users, such as an authorised human administrator. Protected directory file entities 232, 235 can thus be manipulated under direct and/or indirect control of the management interface 205, but are protected from restricted file management activities of the consumer application 241, for example movement from a protected directory.

In the example of FIG. 2, the computer system is optimised for use as backup storage, and the NAS interface enables backup applications 241 from any number of authorised host computers 240, 240a, 240n, to access and use the filesystem for creating large files of backup data sets, although it remains possible for consumer applications to use the computer system 210 as a common NAS device, that is, as primary network file storage. The computer system 210 includes a data deduplication engine 270 for significantly reducing the size of files containing backup data that has been backed up on previous occasions. The deduplication engine 270 in some examples performs inline deduplication and comprises a chunker (not shown) for chunking incoming file data. The deduplication engine 270 maintains a plurality of independent deduplicated data chunk stores 271, 271a, 271n with corresponding lists or manifests of data chunk locations (not shown).

Figure 3:
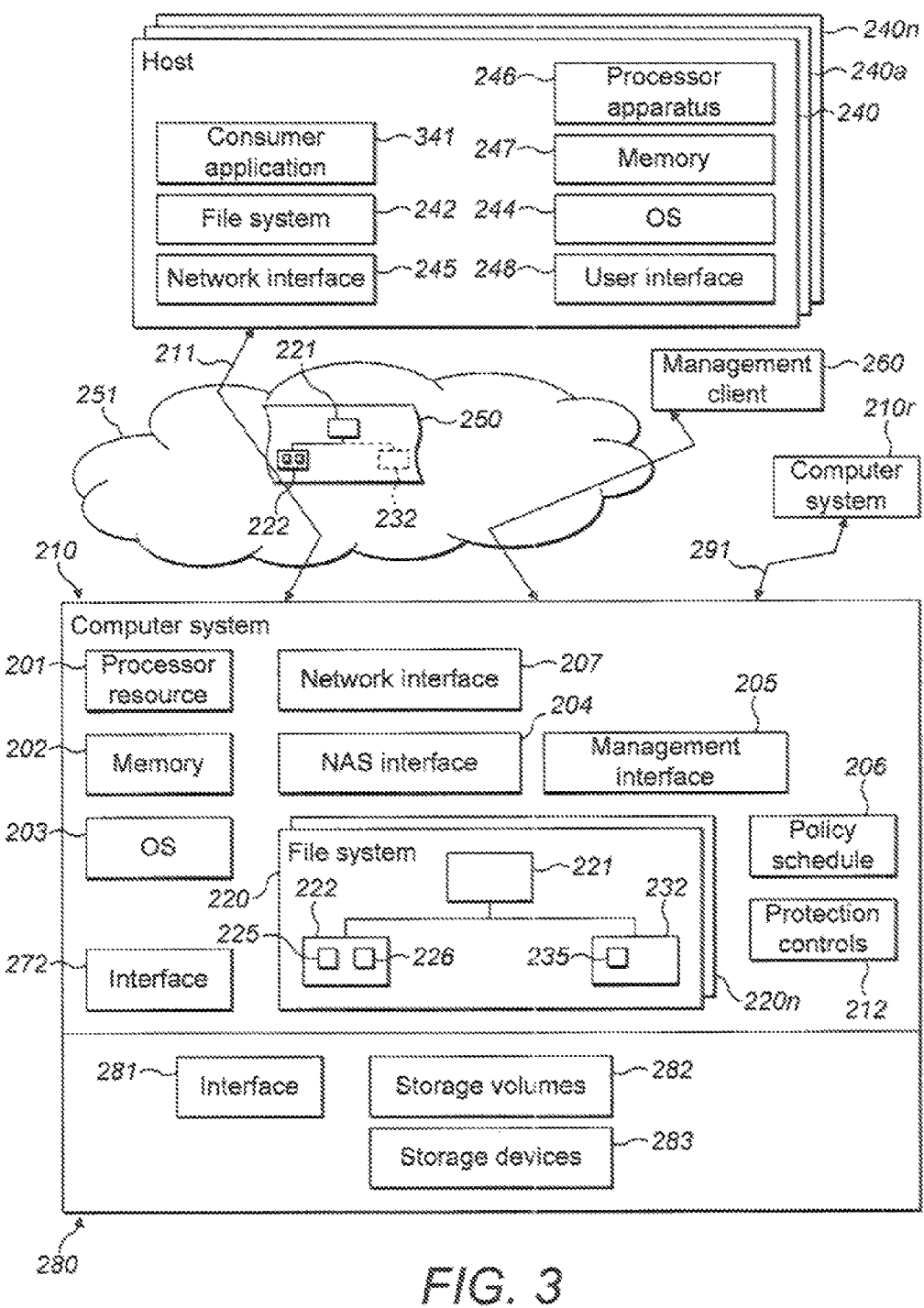
FIG. 3 shows an alternative arrangement of a computer system to provide network filesystem access for a consumer application.

The computer system 210 is provided with an interface 272 to connect to a corresponding interface 281 to mass storage 280, to physically store the data of the chunk stores 271, 271a, 271n maintained by the deduplication engine 270. The storage 280 includes physical storage such as hard disk drives, and/or solid state storage, and/or tape, and in some examples includes a virtualisation entity 282 such as a RAID controller to provide virtual storage volumes for consumption by the filesystem 220 through the deduplication engine 270. The type of interfaces 272, 281 employed can vary as appropriate according to whether the mass storage 280 is included in a physical enclosure with the computer system 210, or directly externally attached, or attached over a storage network or LAN. In alternative embodiments, for example as shown in FIG. 3, where like numerals are used to reference items having a corresponding counterpart item in FIG. 2 with like functionality, no deduplication is provided, and the organisation of data to be transmitted to the storage 280 is controlled by the filesystem(s) 220, 220n. In some embodiments, a consumer application 141, 241, 341 can drag and drop or otherwise manually move file entities from a consumer directory 222 to a protected directory 232 through a user interface 248, for example a GUI or other human user interface.

In some embodiments, various functional components of the computer system 210, such as for example the operating system 203, filesystem 220, NAS interface 204, management interface 205 and operating system 203, are provided by computer readable instructions that are stored on the memory 202, or loaded into the memory 202 from mass storage, for execution by the processor resource 201 to implement the component(s). Some functional components of the computer system 210 and storage 280, such as for example the network interface 207, deduplication engine 270 and storage virtualisation 282, can be implemented at least partially using specialised hardware data processor circuits and/or using computer readable instructions executing on dedicated processor resources.

The computer system 210 in some examples exports different directory shares, which can be in different filesystem instances 220, 220n, for access by different respective hosts 240, 240a, 240n, and special handling code in the filesystem instances 220, 220n can consult different respective policy schedules 206 and/or protection controls 212, or apply the policy schedules 206 and/or protection controls 212 in different ways. In some examples, the computer system 210 is connected over a communication link 291, for example over the network 251 or an alternative LAN, SAN and/or WAN, with a similar further computer system 210r, and arranged to replicate file entities of a protected directory (not shown) of the similar further computer system 210r in a local filesystem 220, 220n of the computer system 210. The computer system 210 in some embodiments applies protection controls 212 and/or policy schedules 206 to the remotely replicated file entities that are different than the protection controls and/or policy schedules applied to the replicatee file entities by the further computer system 210r.

In some embodiments, file entities are movable between a shared directory 121, 123, 124, 221, 222 and a protected directory 132, 133, 134, 232 according to at least one criterium, such as a time or time period relative to a file management event. For example, files that have not been accessed within a specified time period could be automatically moved to a specified location (directory or sub-directory) in the protected directory, and/or the moved files could be limited to a specified file type or moved according to content. In another example, files containing time sensitive information could be moved to the protected directory after final modification, perhaps according to a criterium of containing a special pre-determined user-applied mark, and moved out of the protected directory for access by the consumer application according to a desired release time criterium. Some non-limiting examples of criteria that could be included and, if desired combined, in the policy schedule(s) 206 are as follows, where the "vault" operation relates to movement into a protected directory:

implementation of a policy, the special policy handling code in some examples leaves behind a marker, or tombstone, representing the original file entity.

Physical movement of large stored datasets is not always essential for moving file entities, movement relates essentially to a metadata change relating to the file entity path. To effect movement of file entities, in some examples special code of the computer system 210, for example included with filesystem code of the filesystem 220, 220n, can implement a programmatic API to execute operating system move commands, such as mv or rename, in response to a stored policy, or can point an inode to a new parent directory in response to such policy. Where file entity movement is anticipated between associated consumer directories and protected directories, aligning the associated consumer directories and protected directories with a single respective deduplicated data store 271, 271a, 271n facilitates avoidance of having to reconstitute the deduplicated file entities and physical move the file entity data to a new deduplicated data store via the deduplication engine 270.

Figure 4:
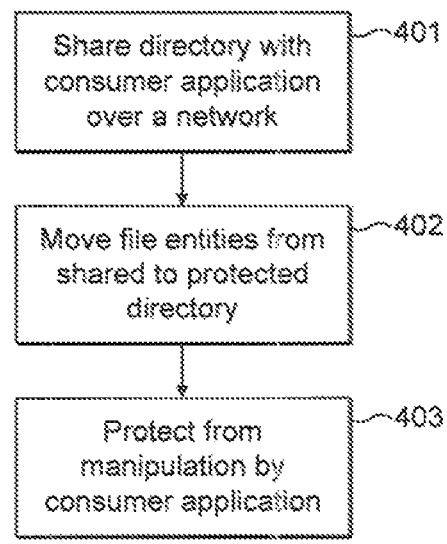
FIG. 4 illustrates a computer-implemented method of operating a network attachable storage system.

FIG. 4 illustrates a method of operating a network attachable storage system. The method comprises sharing a directory with a consumer application over a network (block 401) using, for example, a remote access protocol. The consumer application is in some examples a data protection application such a backup application. The method also comprises moving file entities from the shared directory to a protected directory (block 402) and protecting protected directory file entities from manipulation by the consumer application (block 403). In some examples, the method includes manipulating the protected directory file entities using a management interface. In some embodiments, the method includes moving file entities between the shared directory and the protected directory automatically according to policies managed by the management interface. For example, the method comprises automatically moving file entities between the shared directory and the protected directory according to at least one criterium, the at least one criterium including a time or time period relative to a file management event, such as a time elapsed since a file management event. Alternatively or additionally, the method comprises deduplicating data received from the consumer application, and storing deduplicated data relating

```
vault if filetype is <type>        # where type could be .DOC, .XLS
vault if filetype is 0xAAAA        # specific four byte header found at start of file
vault if file contains "text"      # regular grep type matching for content
vault if file format contains EXAMPLE.TXT   # where file is a backup file, and
# we can deconstruct that backup image and find it contains a specific subfile
vault if file contains "Q110 Results" AND ( date created within Jan-1-2010-Jan-
15-2010 ) # move to vault items containing specific text and if they are
# created within range
vault if file contains "Q110 Results" AND ( not modified for <timeperiod> )
# move only files that haven't been modified recently, hence allows items to be
# modified progressively and then disappear into vault once modifications are
# complete
vault if file name is <name> AND ( not accessed for <timeperiod> )
# move name/named files if not accessed for length of time into vault, i.e.
# gradually expunge content that may not be being consumed.
```

Conversely, file entities can be moved out of the vault, for example using unvault syntax, using suitable policy criteria, as desired. Conveniently, in some examples, the original directory location of file entities moved into a protected directory is stored by the filesystem layer effecting the move, to permit unvaulting of file entities by moving them back to the original consumer directories in accordance with some policy criteria. In moving a file entity to a protected directory by to the shared directory and the protected directory in mass storage using a single data deduplicating store.

In accordance with at least some of the various embodiments, administrators of computer systems can provide a protected directory (including sub-directories as desired) for use by a consumer application to facilitate protection of selected file entities or predetermined types of file entity from unintentional or other modification or deletion by a user of a consumer application. File entities moved to the protected directory are protected from consumer application network file system protocol requests, such as requests to modify, move or delete a file entity, by virtue of being located in the protected directory. Some example embodiments can facilitate flexible configuration by a human administrator of the protections afforded, using a management interface, including selective predetermination of which file entities move into and out of the protected directory and the timing of such movement, and which consumer application file management activities are permitted. Movement of selected file entities out of a local filesystem of a consumer application to a safe area can in some examples facilitate enhanced clarity of presentation of the remaining file entities to a user, and convenient management of the remaining file entities. This can offer particular benefits, for example, to applications using file systems with many files and long file histories, such as backup applications using a large capacity storage system. Various embodiments use standard types of filesystems available in the industry.

Any of the features disclosed in this specification, including the accompanying claims, abstract and drawings, and/or any of the steps of any method or process so disclosed, may be combined in any combination, except combinations were the sum of such features and/or steps are mutually exclusive. Each feature disclosed in this specification, including the accompanying claims, abstract and drawings, may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The claims should not be construed to cover merely the foregoing embodiments, but also any embodiments which fall within the scope of the claims. The invention extends to any novel one, or any novel combination, of the features disclosed in this specification, including the accompanying claims, abstract and drawings, or to any novel one, or any novel combination, of the steps of any method or process so disclosed.

Embodiments within the scope of the present invention also include at least one computer readable medium for having above described computer readable, executable, program instructions or data structures stored thereon, also known as computer software. Such computer readable medium can be any suitable medium accessible by a general purpose or special purpose computer such as host computer system 240 or network attachable computer system 210. Computer executable instructions may comprise, for example, instructions and data which cause a general purpose computer, special purpose computer, or other special purpose processing device to perform a certain function or group of functions. The software of the present invention can be implemented in several different ways. The implementation of the software is not limiting on the invention.

The invention claimed is:

1. A computer system to:
provide a filesystem;
export a shared directory of the filesystem for access by a consumer application over a network;
determine whether one or more protection criteria of the shared directory are satisfied;
in response to a determination that the one or more protection criteria of the shared directory are satisfied:
automatically move one or more file entities from the shared directory to a protected directory; and
prevent performance of file management activities on the one or more file entities of the protected directory by the consumer application.

2. The computer system of claim 1, wherein the one or more protection criteria are specified in one or more stored policies.

3. The computer system of claim 1, wherein the one or more protection criteria specify a time elapsed since a file management event in the shared directory.

4. The computer system of claim 1, comprising a management interface to permit movement of the one or more file entities from the protected directory in response to instructions received by the management interface.

5. The computer system of claim 1, wherein the file management activities include movement of a file entity from the protected directory.

6. The computer system of claim 1, wherein the file management activities include modification or deletion of a file entity of the protected directory.

7. The computer system of claim 1, wherein the one or more protection criteria specify at least one file type of the one or more file entities.

8. The computer system of claim 1, wherein the one or more file entities comprise at least one directory of the filesystem.

9. The computer system of claim 1, wherein the file management activities include discovery of the one or more file entities of the protected directory.

10. The computer system of claim 1, further comprising an inline data deduplication system to deduplicate a plurality of file entities.

11. A non-transitory computer readable medium having computer readable instructions stored thereon to cause a processor included in a server to:
provide, by a server, at least one filesystem including:
a protected directory; and
a shared directory accessible to a consumer application of a client computer using a network filesystem protocol;
determine whether one or more protection criteria are satisfied;
in response to a determination that the one or more protection criteria are satisfied:
automatically move one or more file entities from the shared directory to the protected directory; and
protect one or more file entities in the protected directory from modification by the consumer application from the protected directory.

12. The non-transitory computer readable medium of claim 11, wherein the computer readable instructions cause the processor to permit movement of files between the shared directory and the protected directory using a management interface.

13. The non-transitory computer readable medium of claim 11, wherein the computer readable instructions cause the processor to deprotect protected files in response to a movement of the protected files from the protected directory to the shared directory, and to permit subsequent modification by the consumer application of the deprotected files.

14. The non-transitory computer readable medium of claim 11, wherein the computer readable instructions cause the processor to hide the protected one or more file entities from the consumer application.

15. A computer-implemented method comprising:
sharing, by a server, a shared directory with a consumer application over a network;

determining whether one or more protection criteria are satisfied;

in response to a determination that the one or more protection criteria are satisfied:

automatically moving one or more file entities from the shared directory to a protected directory; and protecting the one or more file entities in the protected directory from manipulation by the consumer application.

16. The method of claim 15, comprising manipulating the protected directory file entities using a management interface.

17. The method of claim 15, wherein the one or more protection criteria are specified in one or more policies managed by a management interface.

18. The method of claim 15, wherein the one or more protection criteria include at least one criterium based on a time or time period relative to a file management event.

19. The method of claim 18, the at least one criterium including a time elapsed since a file management event.

20. The method of claim 15, comprising deduplicating data received from the consumer application, and storing deduplicated data relating to the shared directory and the protected directory in mass storage using a single data deduplicating store.

* * * * *